Dec. 25, 1951  W. E. CAVE  2,579,549
GRASSHOPPER DISPENSER
Filed Nov. 25, 1949

INVENTOR
WILLARD E. CAVE

BY McMorrow, Berman + Davidson
ATTORNEYS

Patented Dec. 25, 1951

2,579,549

UNITED STATES PATENT OFFICE 2,579,549

GRASSHOPPER DISPENSER

Willard E. Cave, Brownsboro, Oreg.

Application November 25, 1949, Serial No. 129,450

2 Claims. (Cl. 43—55)

This invention relates to dispensers, and more particularly to a dispenser to be used by fishermen for carrying and dispensing grasshoppers when desired.

It is an object of this invention to provide a dispenser of the kind to be more particularly described hereinafter to be removably secured on the belt of a fisherman for carrying live grasshoppers for bait. The dispenser is provided with means for dispensing the grasshoppers, one at a time, into the hand of the fisherman as he requires or desires a grasshopper for use as bait.

Another object of this invention is to provide a container of this kind which is simple in structure and operation to provide an economical dispenser of this kind which may be readily actuated by one hand of the fisherman.

Still another object of this invention is to provide a grasshopper dispenser of this kind having a rotatable dispensing cylinder which may be readily actuated by one hand of a fisherman, thereby leaving the other hand free for other use in baiting a fishing line or the like.

With the above and other objects in view, my invention consists in the arrangement, combination and details of construction disclosed in the drawings and specification, and then more particularly pointed out in the appended claims.

Figure 1:
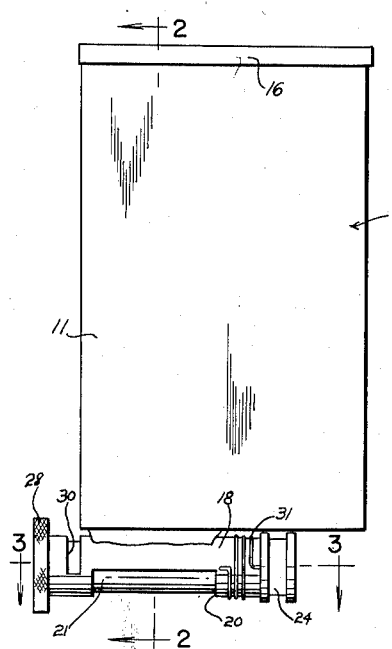
Figure 1 is a front elevation of a grasshopper dispenser constructed according to an embodiment of my invention.

Referring to the drawings, the numeral 10 designates generally a receptacle or container for containing grasshoppers or other similar forms of live bait to be used by a fisherman or the like. The receptacle 10 may be formed of metal, plastic or other suitably rigid and stiff material which may be suitably formed to the desired configuration. Preferably, the container 10 is of a relatively flat formation being substantially rectangular in configuration with elongated front and rear walls 11 and 12 secured together by relatively narrow end walls 14. A bottom wall 15 is engaged with the lower ends of the front, rear and side walls, while the upper end of the container is open, to be closed by a removable closure member 16 which is frictionally engaged over the upper ends of the walls of the container 10.

The bottom wall 15 is formed with an elongated opening or slot 16 therein through which a grasshopper, not shown in the drawings, may crawl to be removed from the container 10 as desired by the fisherman. A resilient clasp or split loop member 17 is fixed on the rear wall 12 to be engaged on the belt of the fisherman for supporting the bait in a readily-accessible position on the clothing of the fisherman.

An open-ended tubular body or cylinder 18 is fixed on the lower side of the bottom wall 15 and extends along the length thereof. The tubular body 18 is formed with a pair of diametrically-disposed, elongated, longitudinal openings 19 and 20 which are registered with the opening 15 in the bottom wall 12 for removing a grasshopper from the container 10.

An inner tubular member or cylinder 21, open at the opposite ends, is rotatably engaged in the outer tubular member 18 constituting therewith a regulator or dispenser valve of which the inner rotatable member 21 may be considered as the core. The core member 21 is formed with a longitudinally-extending slot or opening 22, on one side thereof, which will register with the openings 16 and 19 in the closed position of the core member 21 to permit a grasshopper to be dropped into the core member to be subsequently dispensed.

A nut member 24 is threadedly engaged about one end of the core 21 for securing a screen or transparent member 25 on one end of the dispenser. The nut 24 has an axially extending bore 26 formed therein to permit the passage of light into one end of the core 21 for luring or attracting a grasshopper into the rotatable member 21 from the container 10. The inner end of the nut 24 will bear against one end of the outer tubular casing 18 for holding the core member 21 against sliding in one direction.

A nut 27 is threadably engaged in the other end of the core member 21 and the knurled flange or head 28 bears against the other end of the casing 18 for holding the core 21 against sliding in the other direction. The knurled head 28 provides a suitable finger grid or handle to be engageable by the fingers of the fisherman when he desires to obtain a grasshopper from the container 10. The rotation of the core member 21 is limited to a rotation of 180° for moving the opening 22 therein from a closed position in registry with the opening 19 in the casing 18 to a downwardly-opening position in registry with the lower casing opening 20 from which the grasshopper may be dropped into the cupped hand of the fisherman. A stop or limit pin 29 is fixed adjacent one end of the core member 21 and extends radially outwardly therefrom for sliding engagement in a peripheral slot 30 in one end of the casing 18. A coil spring 31 is engaged about one end of the casing 18 for biasing the rotatable core 21 to the closed position. One end of the spring 31 is engaged on the casing 18, while the other end is secured to one of the nut members, as the nut member 24 is carried by the core 21. For dispensing a grasshopper, the core 21 must be rotated in a direction for tensioning the spring 31, whereby, when a grasshopper is removed from the receptacle 10, release of the head 28 will permit the spring 31 to again close the container 10.

Figure 2:
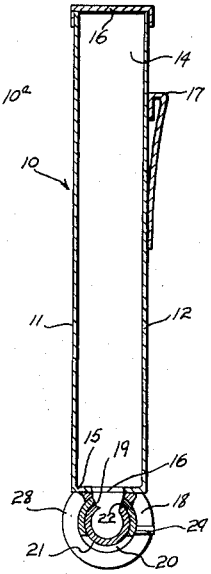
Figure 2 is a transverse section taken on the line 2—2 of Figure 1.

In the use and operation of the grasshopper dispenser, a number of live grasshoppers are initially placed in the container 10. In the normally-closed position of the core or inner tubular member 21 a grasshopper will be attracted into the core by the light entering one end of the core. The space in the core body will be substantially limited to one grasshopper whose body therein will block the light entering the container 10 through the screen or transparent member 25. Upon rotation of the core member 21, the grasshopper will drop through the registered openings 22 of the core and 20 of the casing into the cupped palm of the hand of the fisherman. Upon removal of the hand, the spring 31 will rotate the core 21 to its closed position, clearly shown in Figure 2, for receiving another grasshopper.

Figure 4:
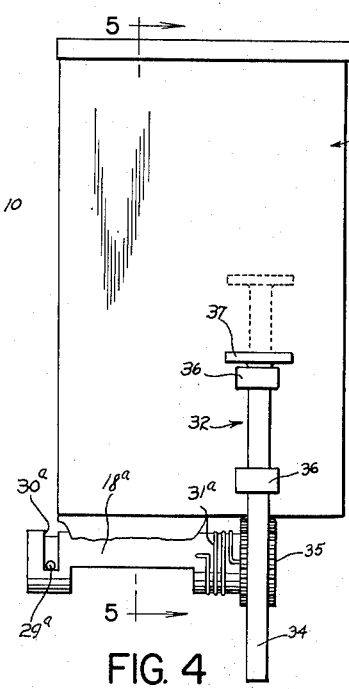
Figure 4 is a front elevation of a modified form of this invention.
Figure 5:
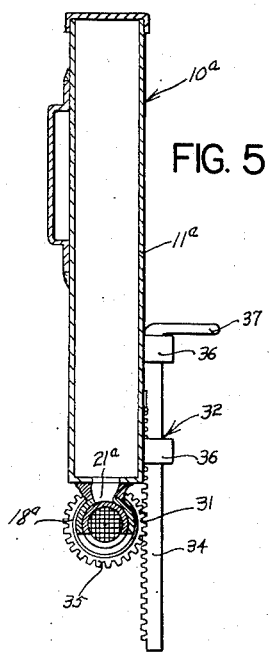
Figure 5 is a vertical, transverse section taken on the line 5—5 of Figure 4.
Figure 3:
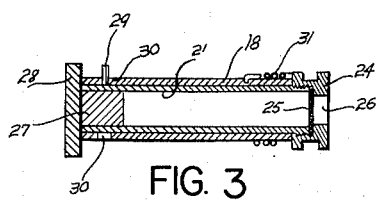
Figure 3 is a longitudinal section through the rotatable cylinder assembly, taken on the line 3—3 of Figure 1.

In Figures 4 and 5 of the drawings, there is shown a modified form of this invention wherein a sliding operator is provided for rotating the core member 21a from its closed position to its open position. The sliding operator 32 comprises a rack bar 34 slidably supported on the front wall 11a of a container 10a formed in substantially the same manner as the container 10 described above. An outer sleeve or casing 18a is fixed on the bottom of the receptacle 10a and an inner core member 21a is rotatable within the casing 18a. The casing 18a and core 21a are formed in substantially the same manner as the casing 18 and core 21 described above, but instead of the head 28 on one end of the core, a gear 35 is fixed on the other end for engagement with the rack bar 34.

A pair of guide members or straps 36 are fixed on the front wall of the container 10a and the rack bar 34 is slidably engaged under the straps. An outwardly-extending thumb or finger grip 37 is formed on the upper end of the rack bar 34 for engagement by the thumb or finger of the fisherman. A coil spring 31a normally biases the core 21a to a closed position, thereby pressing the rack bar 34 upwardly. The limit pin 29a carried by the core 21a is engaged in the slot 30a in the periphery of the casing 18a for limiting the rotative movement of the core 21a from an open to a closed position at the opposite extremities of the 180-degree movement of the core member 21a.

I do not mean to confine myself to the exact details of construction herein disclosed, but claim all variations falling within the purview of the appended claims.

I claim:

1. A grasshopper dispenser comprising a receptacle having a closed bottom and adapted to be secured to the clothing of an individual for holding a supply of grasshoppers, there being a longitudinally extending slot in the bottom of said receptacle and spaced from the sides and ends thereof, a first open-ended cylinder arranged exteriorly and longitudinally of the receptacle bottom and fixedly secured thereto, said first cylinder being provided intermediate its ends with a pair of opposed longitudinally extending openings in registry with each other and with the slot in said receptacle bottom, one of said openings being in communication with the interior of said receptacle and the other of said openings being in communication with the atmosphere, a second open-ended cylinder arranged longitudinally of and within said first cylinder and mounted in the latter for rotative movement, there being a longitudinally extending slot in said second cylinder intermediate the ends of the latter and movable upon rotative movement of said second cylinder from a position in registry with said one opening in said first cylinder for receiving a grasshopper contained in said receptacle to a position in registry with said other opening in said first cylinder for dispensing said grasshopper, a screen extending across and fixedly secured to one end of said second cylinder and adapted to permit the entrance of light therein, and hand actuable means arranged in closing relation with respect to the other end of said second cylinder and secured thereto for effecting the rotative movement of said second cylinder.

2. A grasshopper dispenser comprising a receptacle having a closed bottom and adapted to be secured to the clothing of an individual for holding a supply of grasshoppers, there being a longitudinally extending slot in the bottom of said receptacle and spaced from the sides and ends thereof, a first open-ended cylinder arranged exteriorly and longitudinally of the receptacle bottom and fixedly secured thereto, said first cylinder being provided intermediate its ends with a pair of opposed longitudinally extending openings in registry with each other and with the slot in said receptacle bottom, one of said openings being in communication with the interior of said receptacle and the other of said openings being in communication with the atmosphere, a second open-ended cylinder arranged longitudinally of and within said first cylinder and mounted in the latter for rotative movement, there being a longitudinally extending slot in said second cylinder intermediate the ends of the latter and movable upon rotative movement of said second cylinder from a position in registry with said one opening in said first cylinder for receiving a grasshopper contained in said receptacle to a position in registry with said other opening in said first cylinder for dispensing a grasshopper, a screen extending across and fixedly secured to one end of said second cylinder and adapted to permit the entrance of light therein, spring means wound around said first cylinder adjacent one end thereof and operatively connected to said second cylinder for urging the latter toward its grasshopper-receiving position, and hand actuable means arranged in closing relation with respect to the other end of said second cylinder and secured thereto for effecting the rotative movement of said second cylinder.

WILLARD E. CAVE.

REFERENCES CITED

The following references are of record in the file of this patent:

UNITED STATES PATENTS

| Number | Name | Date |
| --- | --- | --- |
| 738,184 | Goodwin | Sept. 8, 1903 |
| 934,182 | Jopling | Sept. 14, 1909 |
| 2,160,436 | Jones | May 30, 1939 |
| 2,237,189 | McCormack | Apr. 1, 1941 |